United States Patent
Solihin

(10) Patent No.: US 9,304,946 B2
(45) Date of Patent: Apr. 5, 2016

(54) HARDWARE-BASE ACCELERATOR FOR MANAGING COPY-ON-WRITE OF MULTI-LEVEL CACHES UTILIZING BLOCK COPY-ON-WRITE DIFFERENTIAL UPDATE TABLE

(75) Inventor: Yan Solihin, Raleigh, NC (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 142 days.

(21) Appl. No.: 13/813,591

(22) PCT Filed: Jun. 25, 2012

(86) PCT No.: PCT/US2012/043995
§ 371 (c)(1),
(2), (4) Date: Jan. 31, 2013

(87) PCT Pub. No.: WO2014/003707
PCT Pub. Date: Jan. 3, 2014

(65) Prior Publication Data
US 2013/0346714 A1 Dec. 26, 2013

(51) Int. Cl.
G06F 12/16 (2006.01)
G06F 12/08 (2006.01)
G06F 12/10 (2006.01)
G06F 9/38 (2006.01)
G06F 11/14 (2006.01)

(52) U.S. Cl.
CPC .............. *G06F 12/16* (2013.01); *G06F 9/3881* (2013.01); *G06F 12/0882* (2013.01); *G06F 12/10* (2013.01); *G06F 11/1446* (2013.01)

(58) Field of Classification Search
CPC ...................... G06F 2212/651; G06F 2212/681
See application file for complete search history.

(56) References Cited

U.S. PATENT DOCUMENTS 6,182,089 B1   1/2001  Ganapathy et al.
6,308,247 B1  10/2001  Ackerman et al.
6,334,172 B1 * 12/2001  Arimilli et al. ............... 711/144
(Continued)

OTHER PUBLICATIONS

Brian Randell. 1985. Hardware/software tradeoffs: a general design principle?. SIGARCH Comput. Archit. News 13, Jun. 2, 1985, 19-21. DOI=10.1145/1296935.1296938   http://doi.acm.org/10.1145/1296935.1296938.*
Jiang, X, et al. "architecture Support for Improving Bulk Memory Coping and Initialization Performance." Parallel Architechtures and Compilation Techniques, 2009. PACT'09. 18th International Conference on. IEEE, 2009.
(Continued)

*Primary Examiner* — Christian P Chace
*Assistant Examiner* — Chie Yew
(74) *Attorney, Agent, or Firm* — Turk IP Law, LLC

(57) ABSTRACT

Technologies are described herein for providing a hardware-based accelerator adapted to manage copy-on-write. Some example technologies may identify a read request adapted to read a block at an original memory address. The technologies may utilize the hardware-based accelerator to determine whether the block is located at the original memory address. When a determination is made that the block is located in at the original memory address, the technologies may utilize the hardware-based accelerator to pass the original memory address so that the read request can be performed utilizing the original memory address. When a determination is made that the block is not located in the memory at the original memory address, the technologies may utilize the hardware-based accelerator to generate a new memory address and to pass the new memory address so that the read request can be performed utilizing the new memory address.

16 Claims, 6 Drawing Sheets

(56) References Cited

U.S. PATENT DOCUMENTS

| | | | |
|---|---|---|---|
| 7,197,516 B1* | 3/2007 | Hipp et al. | |
| 7,296,139 B1 | 11/2007 | Case et al. | |
| 7,310,712 B1 | 12/2007 | Gordon | |
| 7,650,482 B2 | 1/2010 | Traut et al. | |
| 7,680,996 B2* | 3/2010 | Komarov et al. | 711/162 |
| 2002/0103968 A1* | 8/2002 | Grover | 711/114 |
| 2004/0093474 A1 | 5/2004 | Lin et al. | |
| 2005/0015378 A1* | 1/2005 | Gammel et al. | 707/100 |
| 2005/0027819 A1* | 2/2005 | Nakano et al. | 709/217 |
| 2005/0223321 A1 | 10/2005 | Mather et al. | |
| 2006/0047926 A1* | 3/2006 | Zheng | 711/162 |
| 2006/0235909 A1* | 10/2006 | Oks et al. | 707/204 |
| 2007/0136506 A1 | 6/2007 | Traut et al. | |
| 2008/0270739 A1* | 10/2008 | Hamilton et al. | 711/206 |
| 2009/0248984 A1 | 10/2009 | Shen et al. | |
| 2010/0191757 A1* | 7/2010 | Noguchi et al. | 707/758 |
| 2011/0119234 A1* | 5/2011 | Schack et al. | 707/639 |
| 2011/0231593 A1* | 9/2011 | Yasufuku et al. | 711/3 |
| 2011/0238937 A1* | 9/2011 | Murotani et al. | 711/162 |
| 2012/0233438 A1 | 9/2012 | Bak et al. | |
| 2013/0227248 A1* | 8/2013 | Mehta | G06F 12/1027 711/207 |

OTHER PUBLICATIONS

Warfield, A. et al. "Parallax: Managing storage for a million machines." Proceedings of the 10th Workshop on Hot Topics in Operating Systems. 2005.

Office Action received for U.S. Appl. No. 13/880,194, mailed May 7, 2015 and filed Apr. 18, 2013.

International Search Report & Written Opinion dated Oct. 5, 2012 in PCT Application No. PCT/US12/43995.

Borkar, S. et al., "The Future of Microprocessors," Communications of the ACM, vol. 54 No. 5, pp. 67-77 [http://cacm.acm.org/magazines/2011/5/107702-the-future-of-microprocessors/fulltext], May 2011.

Jiang, X, et al. "Architecture Support for Improving Bulk Memory Copying and Initialization Performance." Parallel Architectures and Compilation Techniques, 2009. PACT'09. 18th International Conference on. IEEE, 2009, pp. 169-180.

Warfield, A. et al. "Parallax: Managing storage for a million machines." Proceedings of the 10th Workshop on Hot Topics in Operating Systems. 2005, vol. 10, pp. 4-4.

Zhao Li, et al. "Hardware support for accelerating data movement in server platform." Computers, IEEE Transactions on 56.6 (2007): 740-753.

* cited by examiner

HARDWARE-BASE ACCELERATOR FOR MANAGING COPY-ON-WRITE OF MULTI-LEVEL CACHES UTILIZING BLOCK COPY-ON-WRITE DIFFERENTIAL UPDATE TABLE

CROSS-REFERENCE TO RELATED APPLICATION

The present application is a U.S. national stage filing under 35 U.S.C. §371 of PCT Application No. PCT/US12/43995, filed on Jun. 25, 2012.

BACKGROUND

Unless otherwise indicated herein, the materials described in this section are not prior art to the claims in this application and are not admitted to be prior art by inclusion in this section.

Copy-on-write ("COW") can be understood as a memory optimization technique that is commonly performed in computer systems. COW can be performed by an operating system ("OS") in a non-virtual environment or by a hypervisor in a virtual environment. In an example implementation of COW, a parent process may create a child process via a fork OS call. When the child process is created, an OS may cause the parent process to share its pages with the child process, rather than create a separate copy of the parent process's pages for the child process. The OS may also impose write protection on the shared pages.

When either the parent process or the child process writes to a shared page, the write protection may cause the OS to raise a write protection exception. In response to the write protection exception, the OS may allocate a child process's page and copy contents of the parent process's page to the child process's page. For example, the OS may execute a loop of load and store operations adapted to copy each word from the parent process's page to the child process's page. The OS may then turn off the write protection on the shared page and return from the exception.

Conventional COW mechanisms suffer from various drawbacks. First, conventional COW mechanisms may involve a central processing unit ("CPU"), thereby occupying the CPU from performing other operations. In particular, the OS may instruct the CPU to copy data from the parent process's page to the child process's page using, for example, the loop of load and store operations. Second, conventional COW mechanisms may result in superfluous copying. In particular, the OS may instruct the CPU to copy each byte or word from the parent process's page to the child process's page, even though the parent process's page and the child process's page may differ by only a few bytes or words. Third, conventional COW mechanisms may result in cache inefficiency. In particular, during the copy process, the parent process's page and the child process's page may be brought into the cache, regardless of whether the data is needed by the CPU. Fourth, conventional COW mechanisms may not be scalable for future computing systems that implement larger page sizes. In particular, because conventional COW mechanisms copy entire pages, larger page sizes may worsen the other drawbacks described above, thereby making such COW mechanisms prohibitively expensive.

SUMMARY

The present disclosure generally describes techniques for providing a hardware-based accelerator adapted to manage copy-on-write ("COW") in a memory of a computer. Some example methods may identify a read request adapted to read a block in the memory at an original memory address. Example methods may utilize the hardware-based accelerator to determine whether the block is located in the memory at the original memory address. When the hardware-based accelerator determines that the block is located in the memory at the original memory address, example methods may utilize the hardware-based accelerator to pass the original memory address to a processor of the computer. The processor may be adapted to perform the read request utilizing the original memory address. When the hardware-based accelerator determines that the block is not located in the memory at the original memory address, example methods may utilize the hardware-based accelerator to generate a new memory address and to pass the new memory address to the processor of the computer. The processor may be adapted to perform the read request utilizing the new memory address.

The present disclosure generally further describes some COW accelerators configured to be implemented on a computer. The COW accelerator may include a lazy copy table and a COW module coupled to the lazy copy table. The COW module may be configured to perform one or more operations. The module may be configured to identify a read request adapted to read a block in a memory of the computer at an original memory address. The module may be configured to determine whether the block is located in the memory at the original memory address utilizing the lazy copy table. The module may be configured to pass the original memory address to a processor of the computer, when the block is determined to be located in the memory at the original memory address. The processor may be adapted to perform the read request utilizing the original memory address. The module may be configured to generate a new memory address and pass the new memory address to the processor of the computer, when the block is determined to not be located in the memory at the original memory address. The processor may be adapted to perform the read request utilizing the new memory address.

The present disclosure generally also describes some computing systems adapted to implement COW. The computing system may include a multicore processor and a COW accelerator. The multicore processor may include a processor core and a cache memory coupled to the processor core. The COW accelerator may be coupled to the cache memory. The COW accelerator may include a lazy copy table and a COW module coupled to the lazy copy table. The module may be configured to perform one or more operations. The module may be configured to identify a read request adapted to read a block in the cache memory at an original memory address. The module may be configured to determine whether the block is located in the cache memory at the original memory address utilizing the lazy copy table. The module may be configured to pass the original memory address to the processor core, when the block is determined to be located in the cache memory at the original memory address. The processor core may be adapted to perform the read request utilizing the original memory address. The module may be configured to generate a new memory address and pass the new memory address to the processor core, when the block is determined to not be located in the cache memory at the original memory address. The processor core may be adapted to perform the read request utilizing the new memory address.

The foregoing Summary is illustrative only and is not intended to be in any way limiting. In addition to the illustrative aspects, embodiments, and features described above, further aspects, embodiments, and features will become apparent by reference to the Figures and the following Detailed Description.

BRIEF DESCRIPTION OF THE FIGURES

The foregoing and other features of this disclosure will become more fully apparent from the following Detailed Description, accompanying Figures, and appended claims. Understanding that these Figures depict only several embodiments in accordance with the disclosure and are, therefore, not to be considered limiting of its scope, the disclosure will be described with additional specificity and detail with reference to the accompanying Figures, in which:

DETAILED DESCRIPTION

Figure 1:
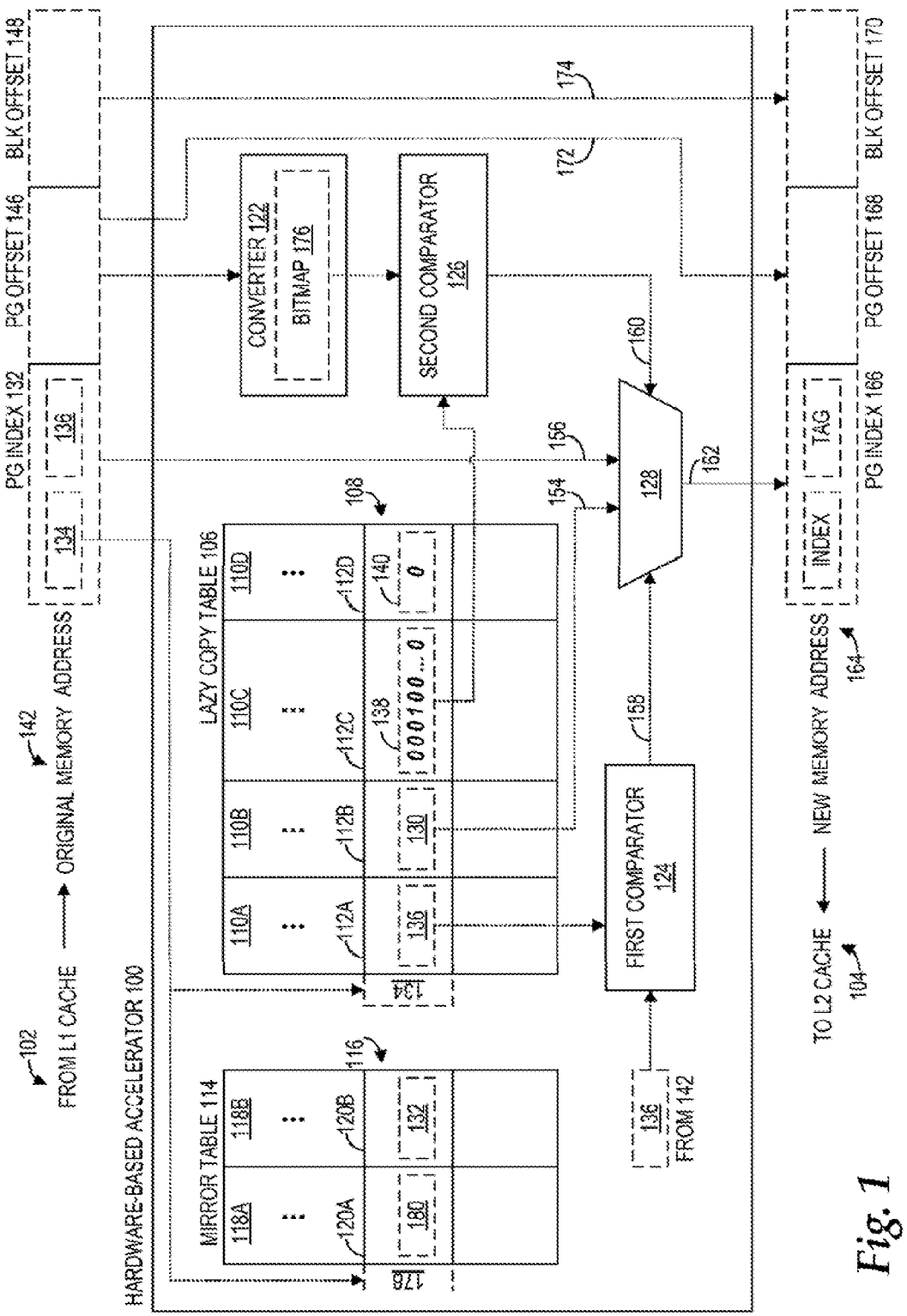
FIG. 1 is a diagram illustrating an example architecture of a hardware-based accelerator adapted to perform copy-on-write operations.

In the present Detailed Description, reference is made to the accompanying Figures, which form a part hereof. In the Figures, similar symbols typically identify similar components, unless context dictates otherwise. The illustrative embodiments described in the Detailed Description and Figures are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to a hardware-based accelerator configured to perform COW operations. The hardware-based accelerator may be configured to perform COW operations in a manner that is transparent to software, such as the OS in a non-virtual environment or a hypervisor in a virtual environment. The hardware-based accelerator may be integrated in a cache, according to various embodiments.

When the OS copies a source page to a destination page (e.g., via a fork OS call), the hardware-based accelerator may be configured to perform a "lazy copy" implementation of COW. In lazy copy, a write to a block in either the source page or the destination page does not cause the entire contents of the source page to be copied to the destination page. Rather, the hardware-based accelerator may be configured to copy only the requested block from the source page to the destination page. The hardware-based accelerator may be configured to maintain a COW status that keeps track of the blocks that have been and have not been copied between the source page and the destination page.

When a process attempts to read a block in the destination page, the hardware-based accelerator may be configured to evaluate the COW status. If the COW status indicates that the corresponding block in the source page has not been copied, then the hardware-based accelerator may be configured to divert the read access to the source page. If the COW status indicates that the corresponding block in the source page has been copied, then the hardware-based accelerator may be configured to allow the read access to the block in the destination page.

When a process attempts to write to a block in the source page or the destination page, the hardware-based accelerator may be configured to evaluate the COW status. If the COW status indicates that the block has been copied, then the hardware-based accelerator may be configured to allow write access to the block in the source page or the destination page. If the COW status indicates that the block has not been copied, then the hardware-based accelerator may be configured to trigger a COW at the block level. More specifically, the hardware-based accelerator may be configured to copy the appropriate block from the source page to the destination page. The hardware-based accelerator may be configured to update the COW status in order to indicate that the block has been copied. When the COW status has been updated, the hardware-based accelerator may be configured to allow the write to the block in either the original page or the destination page.

The hardware-based accelerator addresses various drawbacks found in conventional COW mechanisms. First, use of the hardware-based accelerator may offload page copying from the CPU to the hardware-based accelerator. The hardware-based accelerator may be a dedicated device optimized to perform COW operations very efficiently. Further, by offloading page copying from the CPU, the CPU may be available to perform other tasks. Second, by copying data at a block-level granularity, the hardware-based accelerator may avoid unnecessarily copying from the source page to the destination page blocks that are not modified. Third, by copying data at a block-level granularity, only those blocks that are written by a process may be brought into the cache due to temporal locality. Fourth, by copying data at a block-level granularity, effectiveness of the hardware-based accelerator can be maintained even as the page size increases.

FIG. 1 is a diagram illustrating an example architecture of a hardware-based accelerator 100 adapted to perform COW operations, arranged in accordance with at least some embodiments presented herein. The operation of the hardware-based accelerator 100 may be transparent to the OS. COW operations that are conventionally performed by the OS (via the CPU) may be offloaded to the hardware-based accelerator 100. The hardware-based accelerator 100 may be a dedicated device optimized to perform COW operations very efficiently. The hardware-based accelerator 100 may be integrated in a cache, according to various embodiments. As illustrated in FIG. 1, the hardware-based accelerator may be communicatively coupled to an L1 cache 102 and integrated into an L2 cache 104. In other embodiments, the hardware-based accelerator may be integrated in other cache levels, such as an L1 cache or an L3 cache. For example, when the hardware-based accelerator 100 is integrated into the L2 cache 104, the hardware-based accelerator 100 may be configured to intercept L1 cache miss, write through, and state upgrade requests, along with physical addresses corresponding to the requests.

The hardware-based accelerator 100 may include a lazy copy table ("LCT") 106. The LCT 106 may include multiple records (represented as rows in the LCT 106), such as a record 108. The LCT 106 may also include multiple columns, such as a tag column 110A, a source page index column 110B, a COW status column 110C, or a level column 110D. The LCT 106 may further include multiple entries, each of which corresponds to one of the records and one of the columns 110A-110D. For example, the record 108 may include a first entry 112A corresponding to the tag column 110A, a second entry 112B corresponding to the source page index column 110B, a third entry 112C corresponding to the COW status column 110C, and a fourth entry 112D corresponding to the level column 110D. Each record in the LCT 106 may also be indexed by a corresponding index value. For example, successive records in the LCT 106 may correspond to successive incremental index values.

The hardware-based accelerator 100 may also include a mirror table 114. The mirror table 114 may include multiple records (represented as rows in the mirror table 114, such as a record 116). The mirror table 114 may also include multiple columns, such as a tag column 118A or a destination page index column 118B. The mirror table 114 may further include multiple entries, each of which corresponds to one of the records and one of the columns 118A-118B. For example, the record 116 may include a first entry 120A corresponding to the tag column 118A and a second entry 120B corresponding to the destination page index column 118B. The hardware-based accelerator 100 may further include a binary-to-bitmap converter 122, a first comparator 124, a second comparator 126, and a multiplexer 128.

Each record in the LCT 106 may correspond to a destination page, which is further associated with a source page. For example, the record 108 may correspond to a source page that is located at a source page index 130 and a destination page that is located at a destination page index 132. The destination page index 132 may include an index portion 134 and a remaining tag portion 136. In particular, the record 108 may be indexed by the index portion 134. The tag portion 136 may be stored in the first entry 112A. The source page index 130 may be stored in the second entry 112B.

A COW status array 138 may be stored in the third entry 112C. A level value 140 may be stored in the fourth entry 112D. The COW status array 138 may include multiple status identifiers. In some embodiments, a quantity of status identifiers in the COW status array 138 may equal a quantity of blocks in the source page or the destination page. Each status identifier in the COW status array 138 may correspond to a particular block in the source page and indicate that either the block in the source page has been copied or the block in the source page has not been copied. In some embodiments and as illustrated in FIG. 1, the status identifiers may be status bits. For example, a status bit value of zero may indicate that a corresponding block in the source page has not been copied, while a status bit value of one may indicate that the corresponding block in the source page has been copied.

In some other embodiments, a quantity of status identifiers in the COW status array 138 may be less than a quantity of blocks in the source page or the destination page. The level value 140 may be utilized to specify multiple records that can be utilized to represent a large page that includes a quantity of blocks greater than a quantity of status identifiers in the COW status array 138. At a higher level above a first level, the corresponding record may include a COW status array where each status identifier corresponds to a particular region, rather than a particular block, in the source page. One or more of the regions may include two or more blocks. At the first level, the corresponding record may include a COW status array like the COW status array 138 where each status identifier corresponds to a particular block in the source page. The hardware-based accelerator 100 may be configured to access a particular block in a large page by recursively evaluating each level starting with the highest level and ending at the first level that corresponds to the block. Additional details regarding the level value 140 are provided below with reference to FIG. 2.

In lazy copying, the hardware-based accelerator 100 may be configured to perform copy-on-write on only those blocks of a given page (rather than the entire page itself) that are written by a process. As a result, when a read request is directed a memory address of a destination page, the hardware-based accelerator 100 may effectively allow the read request to retrieve a requested block from the memory address of the destination page if the LCT 106 does not contain a relevant record or a corresponding block in a source page has not been copied. However, if the LCT 106 contains a relevant record and the corresponding block in the source page has been copied, then the hardware-based accelerator 100 may effectively redirect the read request from the memory address of the destination page to a memory address of the source page.

In an illustrative example of a read request, the L1 cache 102 may suffer a cache miss of a block at a particular memory address corresponding to the read request. For purposes of this example, the memory address corresponding to the read request may be referred to as an original memory address 142. The original memory address 142 may correspond to a destination page. As a result of the cache miss, the hardware-based accelerator 100 may be configured to intercept the read request including the original memory address 142 from the L1 cache 102. The original memory address 142 may include three adjacent portions: the destination page index 132, a page offset 146, and a block offset 148. For example, for a four kilobyte (4 KB) page and a sixty-four-byte (64 B) block size implemented on a sixty-four-bit (64b) address space, the page index, the page offset, and the block offset may be fifty-two bits (52b), six bits (6b), and six bits (6b), respectively. As previously described, the destination page index 132 may include the index portion 134 and the tag portion 136.

The multiplexer 128 may be configured to receive the source page index 130 as a first input 154 and the destination page index 132 as a second input 156. The multiplexer 128 may be configured further to receive a result of the first comparator 124 as a first selector input 158 and a result of the second comparator 126 as a second selector input 160. The multiplexer 128 may be configured to produce an output 162 of either the source page index 130 (i.e., the first input 154) or the destination page index 132 (i.e., the second input 156) based on a value of at least one of the two selector inputs 158, 160.

The hardware-based accelerator 100 may be configured to generate a new memory address 164 based, at least in part, on the original memory address 142. The new memory address 164 may include three adjacent portions: a page index 166, a page offset 168, and a block offset 170. The hardware-based accelerator 100 may be configured to pass the new memory address 164 (along with the read request) to the L2 cache 104. The L2 cache 104 may attempt to retrieve the data at the new memory address 164 in accordance with the read request.

As illustrated in FIG. 1, the page offset 146 may form the page offset 168 as indicated by arrow 172, and the block offset 148 may form the block offset 170 as indicated by arrow 174. The page index 166 may be either the source page index 130 from LCT 106 or the destination page index 132 from the original memory address 142 depending on the output 162 of the multiplexer 128. If the hardware-based accelerator 100 determines that data can be found at the original memory address 142, then the multiplexer 128 may be configured to output the destination page index 132. That is, if the hardware-based accelerator 100 determines that the data can be found at the original memory address 142, then the hardware-based accelerator 100 may be configured to effectively pass the memory address of the destination page (i.e., the original memory address 142) to the L2 cache 104. If the hardware-based accelerator 100 determines that data cannot be found at the original memory address 142, then the multiplexer 128 may be configured to output the source page index 130. That is, if the hardware-based accelerator 100 determines that the data cannot be found at the original memory address 142, then the hardware-based accelerator 100 may be configured to effectively pass the memory address of the source page to the L2 cache 104.

As previously described, the record 108 may be indexed by the index portion 134 of the destination page index 132. As a result, the first comparator 124 may receive as inputs the tag portion stored in the first entry 112A and the tag portion 136 from the destination page index 132. The first comparator 124 may be configured to compare the tag portion stored in the first entry 112A and the tag portion 136. If the tag portion stored in the first entry 112A and the tag portion 136 do not match, then the first comparator 124 may be configured to output a first signal as the first selector input 158. If the tag portion stored in the first entry 112A and the tag portion 136 match, then the first comparator 124 may be configured to output a second signal as the first selector input 158. In the example illustrated in FIG. 1, the tag portion stored in the first entry 112A matches the tag portion 136.

The binary-to-bitmap converter 122 may be configured to receive the page offset 146 of the original memory address 142. The page offset 146 may be a binary value. The page offset 146 may identify the specific block that is being requested in the destination page. The binary-to-bitmap converter 122 may be configured to generate a bitmap 176 that includes a quantity of bits equal to the quantity of blocks in the source page or the destination page. The bit in the bitmap 176 that corresponds to the block identified by the page offset 146 may be set to a bit value of one, while all other bits in the bitmap 176 may be set to a bit value of zero. The binary-to-bitmap converter 122 may be configured to output the bitmap 176 to the second comparator 126.

The second comparator 126 may be configured to perform a bitwise AND operation on the bitmap 176 and the COW status array 138. As previously described, the COW status array 138 may be implemented as an array of status bits, where a bit value of zero may indicate that a corresponding block in the source page has not been copied and a bit value of one may indicate that the corresponding block in the source page has been copied. If the requested block corresponds to a block in the source page that has been copied, then the result of the bitwise AND operation may be non-zero. If the requested block corresponds to a block in the source page that has not been copied, then the result of the bitwise AND operation may be zero. If the result of the bitwise AND operation is not zero, then the second comparator 126 may be configured to output a third signal as the second selector input 160. If the result of the bitwise AND operation is zero, then the second comparator 126 may be configured to output a fourth signal as the second selector input 160.

If the first selector input 158 is the first signal (i.e., the tag portion stored in the first entry 112A and the tag portion 136 do not match), then the multiplexer 128 may be configured to output the destination page index 132, regardless of the second selector input 160. If the first selector input 158 is the second signal (i.e., the tag portion stored in the first entry 112A and the tag portion 136 match) and the second selector input 160 is the third signal (i.e., the requested block corresponds to a block in the source page that has been copied), then the multiplexer 128 may be configured to output the destination page index 132. If the first selector input 158 is the second signal and the second selector input 160 is the fourth signal (i.e., the requested block corresponds to a block in the source page that has not been copied), then the multiplexer 128 may be configured to output the source page index 130.

In an illustrative example of a write request, a process may attempt to write to a block in the L1 cache 102 at a particular memory address corresponding to the write request. For purposes of this example, the memory address corresponding to the write request may be referred to as the original memory address 142. The original memory address 142 may correspond to a destination page. As previously described, the original memory address 142 may include the destination page index 132, the page offset 146, and the block offset 148. The destination page index 132 may include the index portion 134 and the tag portion 136.

The requested block may be stored in the L1 cache 102 in a write protected state. The write protected state may be utilized to ensure notification of an attempted write request to the hardware-based accelerator 100. For example, the block may be stored in the L1 cache 102 in a "shared" cache coherence state, rather than an "exclusive" or "modified" state. Due to the "shared" cache coherence state, the attempted write to the block in the L1 cache 102 may cause the L1 cache 102 to send an upgrade or invalidation request down through the cache hierarchy. The hardware-based accelerator 100 may be configured to intercept the request.

Upon intercepting the request, the hardware-based accelerator 100 may be configured to identify a record in the LCT 106 that is indexed by the index portion 134 of the destination page index 132. In this illustrative example, the record 108 may be indexed by the index portion 134. By utilizing the record 108, the hardware-based accelerator 100 may be configured to generate the memory address of the source page and to copy a corresponding block from the source page to the destination page at the original memory address 142. It should be appreciated that, in this example, there may be no need to generate the new memory address 164 to be passed to the L2 cache 104. In particular, a write operation may trigger copying of a block from the source page to the destination page. Once copying is complete, the write operation may proceed using the original memory address 142, whether the original memory address 142 is to a source block or a destination block.

The hardware-based accelerator 100 may be configured to remove the write protected state of the block in the L1 cache 102. For example, the hardware-based accelerator 100 may be configured to modify the "shared" cache coherence state to an "exclusive" or "modified" state. Further, the hardware-based accelerator 100 may be configured to update the status identifier associated with the requested block in the COW status array 138 in order to indicate that the requested block has been copied from the source page. For example, the hardware-based accelerator 100 may be configured to modify a particular bit corresponding to the requested block from a bit value of zero indicating that the requested block has not been copied to a bit value of one indicating that the requested block has been copied. When the corresponding block in the source page has been copied to the requested block in the destination page, the hardware-based accelerator 100 may be configured to allow the process to write to the requested block in the destination page.

The above example of a write request attempts to write to the destination page. That is, an attempt to write to a block in the destination page may trigger a COW of a corresponding block from the source page to the destination page. However, an attempt to write to a block in the source page should also trigger a copy-on-write of the block from the source page to a corresponding block in the destination page. According to various embodiments, the hardware-based accelerator 100 may be configured to utilize the mirror table 114 in order to handle write attempts to the source page.

Each record in the mirror table 114 may correspond to a source page, which is further associated with a destination page. For example, the record 116 may correspond to the source page that is located at a source page index 130 and the destination page that is located at the destination page index 132. The source page index 130 may include a fixed index portion 178 and a remaining tag portion 180. In particular, the record 116 may be indexed by the index portion 178. The tag portion 180 may be stored in the first entry 120A. The destination page index 132 may be stored in the second entry 120B.

Each record in the mirror table 114 may effectively mirror a corresponding record in the LCT 106. While each record in the LCT 106 may be indexed and searched via an index portion of a destination page memory address, each record in the mirror table 114 may be indexed and searched via an index portion of a source page memory address. For example, the record 108 may correspond to a destination page at the destination page index 132. As a result, the record 108 may be indexed by the index portion 134 and store the tag portion 136 in the first entry 112A. The second entry 112B of the record 108 may also indicate that the destination page at the original memory address 142 corresponds to a source page at the source page index 130. Accordingly, the mirror table 114 may include the record 116 that mirrors the record 108.

Thus, when the hardware-based accelerator 100 intercepts a write request directed to a particular memory address, the hardware-based accelerator 100 may be configured to evaluate both the LCT 106 and the mirror table 114. If the memory address of the write request corresponds to the destination page memory address, then the memory address may be identified via the LCT 106. If the memory address of the write request corresponds to a source page memory address, then the memory address may be identified via the mirror table 114. An identification of a memory address of the write request in either the LCT 106 or the mirror table 114 may trigger a COW of a block from the source page to the destination page.

In another illustrative example of a write request, the L1 cache 102 may attempt to write to a block at a particular memory address corresponding to the write request. For purposes of this example, the memory address corresponding to the write request may be referred to as source page memory address. The source page memory address may correspond to a source page. The source page memory address may include the source page index 130, a page offset, and a block offset. As previously described, the source page index 130 may include the index portion 178 and the tag portion 180.

The requested block may be stored in the L1 cache 102 in a write protected state. The write protected state may be utilized to ensure notification of an attempted write request to the hardware-based accelerator 100. Corresponding blocks from the source and destination page addresses may be stored separately at the L1 cache, regardless of whether copying for the blocks have completed or not at the L2 cache. However, both of the blocks will be stored in a write protected state in the L1 cache. For example, the block may be stored in the L1 cache 102 in a "shared" cache coherence state, rather than an "exclusive" or "modified" state. Due to the "shared" cache coherence state, the attempted write to the block in the L1 cache 102 may cause the L1 cache 102 to send an invalidation request down through the cache hierarchy. The hardware-based accelerator 100 may be configured to intercept the invalidation request.

Upon intercepting the invalidation request, the hardware-based accelerator 100 may be configured to identify a record in the LCT 106 that is indexed by the index portion 178 of the source page index 130. When the hardware-based accelerator 100 cannot identify such record, the hardware-based accelerator 100 may be configured to identify a record in the mirror table 114 that is indexed by the index portion 178 of the source page index 130. In this illustrative example, the record 116 may be indexed by the index portion 178. If the tag portion 180 stored in the first entry 120A matches with the tag portion 136 of the original memory address 142, the hardware-based accelerator 100 may be configured to identify a second record in the LCT 106, where the index portion stored in the second entry 120B indexes the index portion 134, and the tag portion stored in the second entry 120B matches with the tag portion 136.

By utilizing the second record, the hardware-based accelerator 100 may be configured to determine a memory address of the destination page and to copy the requested block from the source page at the source page memory address to a corresponding block in the destination page. The hardware-based accelerator 100 may be configured to remove the write protected state of the requested block in the L1 cache 102. For example, the hardware-based accelerator 100 may be configured to modify the "shared" cache coherence state to an "exclusive" or "modified" state. Further, the hardware-based accelerator 100 may be configured to update the status identifier associated with the requested block in the COW status array 138 in order to indicate that the requested block has been copied. For example, the hardware-based accelerator 100 may be configured to modify a particular bit corresponding to the requested block from a bit value of zero indicating that the requested block has not been copied to a bit value of one indicating that the requested block has been copied. When the requested block in the source page has been copied to the corresponding block in the destination page, the hardware-based accelerator 100 may be configured to allow the process to write to the requested block in the source page.

At some point, the hardware-based accelerator 100 may need to deallocate one or more records in the LCT 106. In a first example, a process (e.g. a child process) sharing a page utilized in the LCT 106 may terminate or make a system call, such as the exec family of functions (e.g., execl( ) execle( ), execlp( ) etc.). When the process terminates or makes the system call, the hardware-based accelerator 100 may be configured to deallocate the records in the LCT 106 without completing the copy-on-write for the remainder of blocks that have not been copied.

In a second example, the LCT 106 may become full such that new records cannot be created for additional pages. In order to create a new record in the LCT 106, at least one of the existing records may need to be evicted. In some embodiments, the hardware-based accelerator 100 may be configured to evict an oldest record associated with a source page having the highest pop count, or evict a record based on taking into account the combination of age, recentness of access, or pop count. The pop count may refer to the quantity of blocks of the source page that have been copied. Prior to evicting the oldest record from the LCT 106, the hardware-based accelerator 100 may be configured to complete the COW for the remaining uncopied blocks. By selecting the source page with the highest pop count, the hardware-based accelerator 100 can perform the least amount of work to complete the copy-on-write prior to the eviction.

In a third example, the hardware-based accelerator 100 may be configured to maintain a profitability threshold for a source page involved in lazy copying. In particular, the hardware-based accelerator 100 may be configured to monitor the pop count associated with the source page. When the pop count exceeds the profitability threshold, the hardware-based accelerator 100 may be configured to complete the COW for the remaining uncopied blocks and deallocate a corresponding record from the LCT 106. The profitability threshold may be set at a level at which the source page and the destination page differ to such an extent that the hardware-based accelerator 100 in the LCT 106 no longer provides sufficient performance benefit.

The above description of the hardware-based accelerator 100 is applicable when the processes (e.g., a parent process and a child process) sharing a page run on cores or thread contexts that share the same cache hierarchy integrating the hardware-based accelerator 100. For example, if the L2 cache 104 is shared among multiple cores, then the hardware-based accelerator 100 integrated in the L2 cache may provide lazy copy functionality to processes that run on the cores that share the L2 cache 104. For processes that run on cores that do not share the same cache hierarchy integrating the hardware-based accelerator 100, several possible solutions may be available.

In an illustrative example, a parent process may run on a first core that is associated with a first cache hierarchy. A child process may be migrated to run on a second core that is associated with a second cache hierarchy. In a first example solution, the hardware performing the migration may deallocate the LCT 106 and copy blocks in pages involved in lazy copying from the first cache hierarchy to the second cache hierarchy. In a second example solution, both source and destination blocks in pages involved in lazy copying may be stored in the first cache hierarchy in a "modified" cache coherence state. When the child process attempts to read one of the corresponding blocks in the second cache hierarchy, the first cache hierarchy may generate a coherence intervention request. The hardware-based accelerator 100 may be configured to intercept the coherence intervention request. In response to intercepting the coherence intervention request, the hardware-based accelerator 100 may be configured to copy the blocks from the source to destination page, supply or transfer the block from first cache hierarchy to the second cache hierarchy, and update the cache coherence state accordingly.

In addition to handling COW, the hardware-based accelerator 100 may also be configured to handle a hypervisor's transparent page sharing ("TPS"). In TPS, each page across virtual machines may be hashed to find potential copies. When a first and second page are found to have the same content, the first page may be mapped to the second page, and a physical page corresponding to the first page may be deallocated. The hardware-based accelerator 100 may be configured to generate a record corresponding to the two pages in the LCT 106. The LCT 106 may keep track of differences between the two pages and perform lazy copying of only necessary blocks between the two pages.

As previously described, the quantity of status identifiers in the COW status array 138 may correspond to the quantity of blocks in a page, in accordance with some embodiments. For example, a four-kilobyte page (4 KB) with a block size of a sixty-four bytes (64 B) may include sixty-four (i.e., 4 KB/64 B=64) blocks. In this example, the COW status array 138 may include sixty-four status identifiers. If page size increases, then the quantity of blocks in a page may be greater than the quantity of status identifiers in the COW status array 138. In such cases, the LCT 106 may utilize the level column 110D to implement multiple records (i.e., levels) to represent a large page. Additional details regarding the level column 110D are provided below with reference to FIG. 2.

Figure 2:
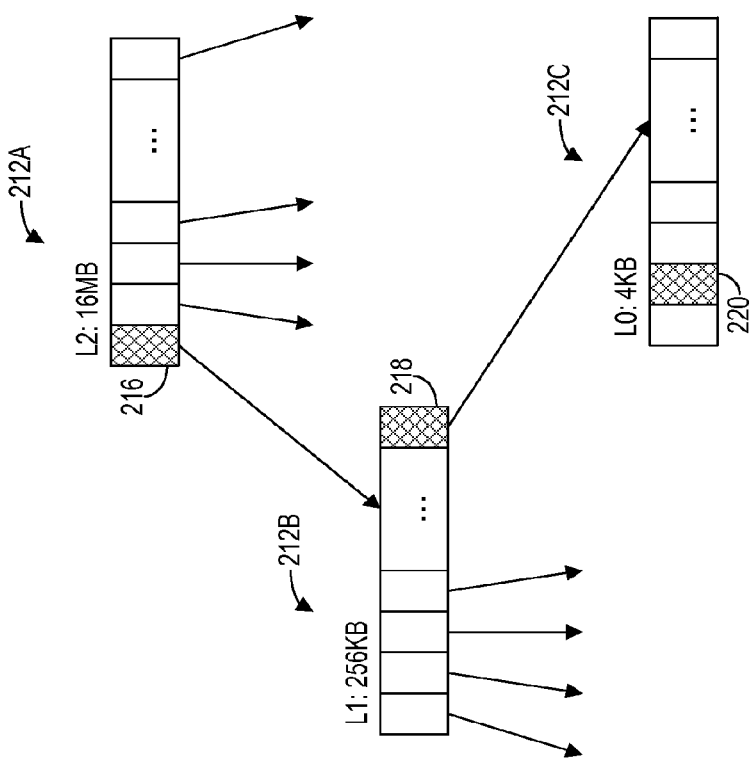
FIG. 2 is a diagram illustrating an example architecture of a lazy copy table adapted to implement multiple levels to represent a large page.

FIG. 2 is a diagram illustrating an example architecture of a LCT 200 adapted to implement multiple levels to represent a large page, arranged in accordance with at least some embodiments presented herein. The LCT 200 may include multiple records (represented as rows in the LCT 200), such as records 202A-202C. The LCT 200 may also include multiple columns, such as a tag column 204A, a source page index column 204B, a COW status column 204C, or a level column 204D.

The LCT 200 may further include multiple entries, each of which corresponds to one of the records and one of the columns 204A-204D. For example, the first record 202A may include a first entry 206A corresponding to the tag column 204A, a second entry 206B corresponding to the source page index column 204B, a third entry 206C corresponding to the COW status column 204C, and a fourth entry 206D corresponding to the level column 204D. The second record 202B may include a first entry 208A, a second entry 208B, a third entry 208C, and a fourth entry 208D. The third record 202C may include a first entry 210A, a second entry 210B, a third entry 210C, and a fourth entry 210D.

The records 202A-202C may represent multiple levels 212A-212C of a large page. In particular, the first record 202A may represent a third level (L2) 212A, which is indicated in the LCT 200 by a level value of two in the fourth entry 206D. The second record 202B may represent a second level (L1) 212B, which is indicated in the LCT 200 by a level value of one in the fourth entry 208D. The third record 202C may represent a first level (L0) 212C, which is indicated in the LCT 200 by a level value of zero in the fourth entry 210D. The records 202A-202C may be indexed by an index value 216.

In an illustrative example, the records 202A-202C may be utilized to represent a sixteen-megabyte (16 MB) page. In particular, the third level 212A may be divided into sixty-four L2 regions, each being two hundred and fifty-six kilobytes (16 MB/64=256 KB) in size. The base addresses of the L2 regions in a destination page and a source page may be represented by a tag value (P2) in the first entry 206A and a source page index (P1) in the second entry 206B, respectively. A first COW status array 214A in the third entry 206C may indicate that a first L2 region 216 in the third level 212A has been modified.

The second level 212B may be divided into sixty-four L1 regions, each being four kilobytes (256 KB/64=4 KB). The base addresses of the L1 regions in the destination page and the source page may be represented by a second tag value (P2+x) in the first entry 208A and a second source page index (P1+x) in the second entry 208B, respectively. A second COW status array 214B in the third entry 208C may indicate that a last L1 region 218 in the second level 212B has been modified.

The first level 212C may be divided in sixty-four L0 regions, each being sixty-four bytes (4 KB/64=6 4 B) and corresponding to the block size. The base addresses of the L0 regions in the destination page and the source page may be represented by a third tag value (P2+y) in the first entry 210A and a third source page index (P1+y) in the second entry 210B, respectively. A third COW status array 214C in the third entry 210C may indicate that a second block 220 in the first level 212C has been modified.

As described above, the hardware-based accelerator 100 may be configured to access a particular block in a large page by recursively evaluating each level starting with the highest level and ending when either the copy status identifier indicates that the region has not been modified (for example, COW status bit is zero for the region) or the level value reaches zero. In particular, the hardware-based accelerator 110 may be configured to identify a region corresponding to the block in a given level. The hardware-based accelerator 110 may be configured to decrement the level value and to identify another region corresponding to the block in the lower level. The hardware-based accelerator 110 may be configured to repeat the process of decrementing the level value and identifying an appropriate region corresponding to the block until the hardware-based accelerator 110 reaches the block on the first level.

Figure 3:
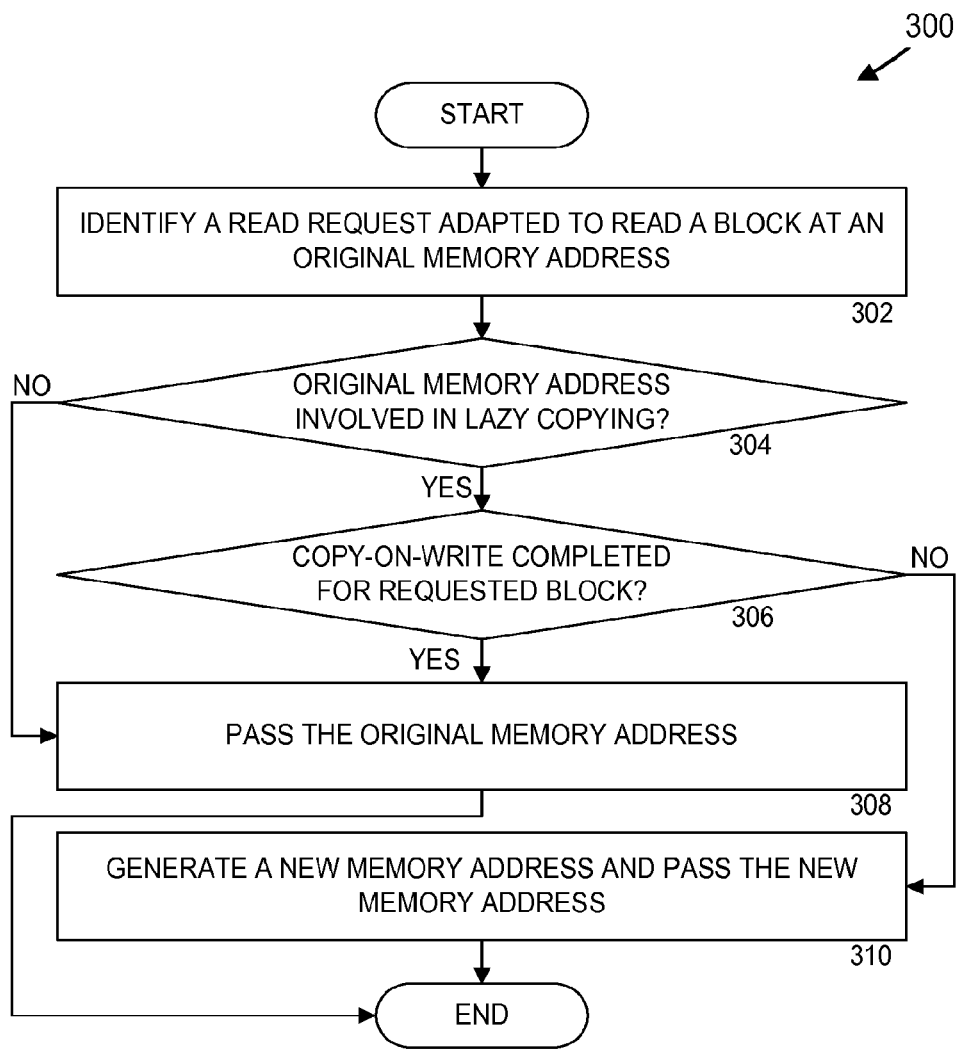
FIG. 3 is a flow diagram illustrating an example process adapted to provide a hardware-based accelerator adapted to manage copy-on-write.

FIG. 3 is a flow diagram illustrating an example process 300 adapted to provide a hardware-based accelerator adapted to manage copy-on-write, arranged in accordance with at least some embodiments presented herein. The process 300 may include various operations, functions, or actions as illustrated by one or more blocks 302-310.

The process 300 may begin at block 302 (Identify a Read Request Adapted to Read a Block at an Original Memory Address), where a hardware-based accelerator, such as the hardware-based accelerator 100, may be configured to identify a read request from a block at an original memory address, such as the original memory address 142. For example, the hardware-based accelerator 100 may be configured to intercept read requests directed to a particular cache level. The hardware-based accelerator 100 may be configured to manage a lazy copying implementation of COW. Block 302 may be followed by block 304.

At block 304 (Original Memory Address Involved in Lazy Copying?), the hardware-based accelerator 100 may be configured to determine whether the original memory address corresponds to a destination page that is involved in lazy copying. According to various embodiments, the hardware-based accelerator 100 may be configured to evaluate the LCT 106 in order to determine whether the original memory address corresponds to a destination page that is involved in lazy copying. For example, the original memory address 142 may include the destination page index 132, the page offset 146, and the block offset 148. The destination page index 132 may include the index portion 134 and the tag portion 136.

The hardware-based accelerator 100 may be configured to evaluate the LCT 106 in order to identify a record in the LCT 106 that is indexed by the index portion 134. Upon identifying the record in the LCT 106 that is indexed by the index portion 134, the hardware-based accelerator 100 may be configured to compare the tag stored in the identified record with the tag portion 136. If the tag stored in the identified record does not match the tag portion 136, then it can be concluded that the LCT 106 does not contain a record corresponding to the original memory address 142, and block 304 may be followed by 308. If the tag stored in the identified record matches the tag portion 136, then it can be concluded that the LCT 106 contains a record corresponding to the original memory address 142, and block 304 may be followed by block 306.

At block 306 (Copy-On-Write Completed for the Requested Block?), the hardware-based accelerator 100 may be configured to determine whether COW has been completed for the requested block. According to various embodiments, the hardware-based accelerator 100 may be configured to determine whether a COW status in the identified record indicates that a corresponding block in a source page has been copied to the requested block in the destination page. For example, the COW status may be implemented as an array of status identifiers, such as the COW status array 138. If the COW status in the identified record indicates that a corresponding block in the source page has been copied to the requested block in the destination page, then block 306 may be followed by block 308. If the COW status in the identified record indicates that the corresponding block in the source page has not been copied to the requested block in the destination page, then block 306 may be followed by block 310.

At block 308 (Pass the Original Memory Address), the hardware-based accelerator 100 may be configured to pass the original memory address 142 to the next cache level so that the read request can be completed utilizing the original memory address 142. After block 308, the process 300 either repeat (e.g., periodically, continuously, or on demand as needed) or terminate.

At block 310 (Generate a New Memory Address and Pass the New Memory Address), the hardware-based accelerator 100 may be configured to generate a new memory address 164 that is directed to the corresponding block in the source page. For example, the hardware-based accelerator 100 may be configured to generate the new memory address 164 utilizing at least some data contained in the identified record. The hardware-based accelerator 100 then may be configured to pass the new memory address 164 to the next cache level so that the read request can be completed utilizing the new memory address 164. After block 310, the process 300 either repeat (e.g., periodically, continuously, or on demand as needed) or terminate.

Figure 4:
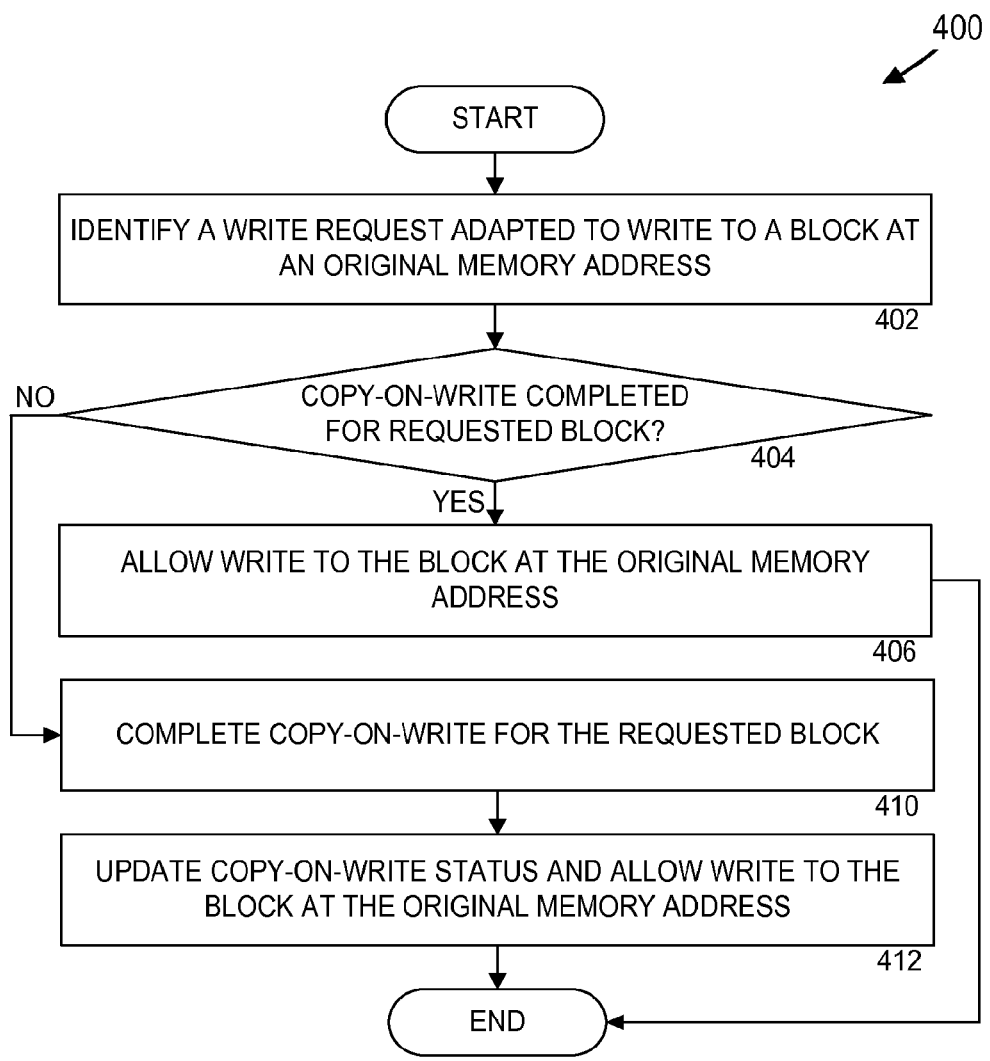
FIG. 4 is a flow diagram illustrating an example process adapted to provide a hardware-based accelerator adapted to manage copy-on-write.

FIG. 4 is a flow diagram illustrating an example process 400 adapted to provide a hardware-based accelerator adapted to manage copy-on-write, arranged in accordance with at least some embodiments presented herein. The process 400 may include various operations, functions, or actions as illustrated by one or more blocks 402-412.

The process 400 may begin at block 402 (Identify a Write Request Adapted to Write to a Block at an Original Memory Address), where a hardware-based accelerator, such as the hardware-based accelerator 100, may be configured to identify a write request to a block at an original memory address, such as the original memory address 142. For example, the hardware-based accelerator 100 may be configured to intercept write, write through, or state upgrade requests directed to a particular cache level. The hardware-based accelerator 100 may be configured to manage a lazy copying implementation of COW. Block 402 may be followed by block 404.

At block 404 (Copy-On-Write Completed for Requested Block?), where the hardware-based accelerator 100 may be configured to determine whether COW has been completed for the requested block. More specifically, the hardware-based accelerator 100 may be configured to evaluate a particular record in the LCT 106 that corresponds to the original memory address 142. The original memory address 142 may refer to either a source page or a destination page. That is, a write request to either the source page or the destination page should trigger the hardware-based accelerator 100.

If the original memory address 142 refers to the source page, then the hardware-based accelerator 100 may be configured to determine whether the requested block in the source page has been copied to a corresponding block in the destination page, based on the appropriate records in the mirror table 114 and LCT 106. If the requested block in the source page has been copied to the corresponding block in the destination page, then block 404 may be followed by block 406. If the requested block in the source page has not been copied to the corresponding block in the destination page, then block 404 may be followed by block 410.

If the original memory address 142 refers to the destination page, then the hardware-based accelerator 100 may be configured to determine whether a corresponding block in the source page has been copied to the requested block in the destination page, based on the appropriate record in the LCT 106. If the corresponding block in the source page has been copied to the requested block in the destination page, then block 404 may be followed by block 406. If the corresponding block in the source page has not been copied to the requested block in the destination page, then block 404 may be followed by block 410.

At block 406 (Allow Write to the Block at the Original Memory Address), the hardware-based accelerator 100 may be configured to allow the write request to be completed to the requested block utilizing the original memory address. After block 406, the process 400 either repeat (e.g., periodically, continuously, or on demand as needed) or terminate.

At block 410 (Complete COW for the Requested Block), the hardware-based accelerator 100 may be configured to complete the COW for the requested block. If the original memory address 142 refers to the source page, then the hardware-based accelerator 100 may be configured to copy the requested block from the source page to a corresponding block in the destination page as identified by new memory address 164. If the original memory address 142 refers to the destination page, then the hardware-based accelerator 100 may be configured to copy a corresponding block in the source page to the requested block in the destination page. Block 410 may be followed by block 412.

At block 412 (Update Copy-On-Write Status and Allow Write to the Block at the Original Memory Address), the hardware-based accelerator 100 may be configured to update the COW status in the appropriate record in the LCT 106 such that the COW status indicates that COW has been completed for the requested block between the source page and the destination page. For example, the hardware-based accelerator 100 may be configured to update the status identifier in the COW status array 138 that corresponds to the requested block. The hardware-based accelerator 100 then may be configured to allow the write request to be completed to the requested block utilizing the original memory address. After block 412, the process 400 either repeat (e.g., periodically, continuously, or on demand as needed) or terminate.

Figure 5:
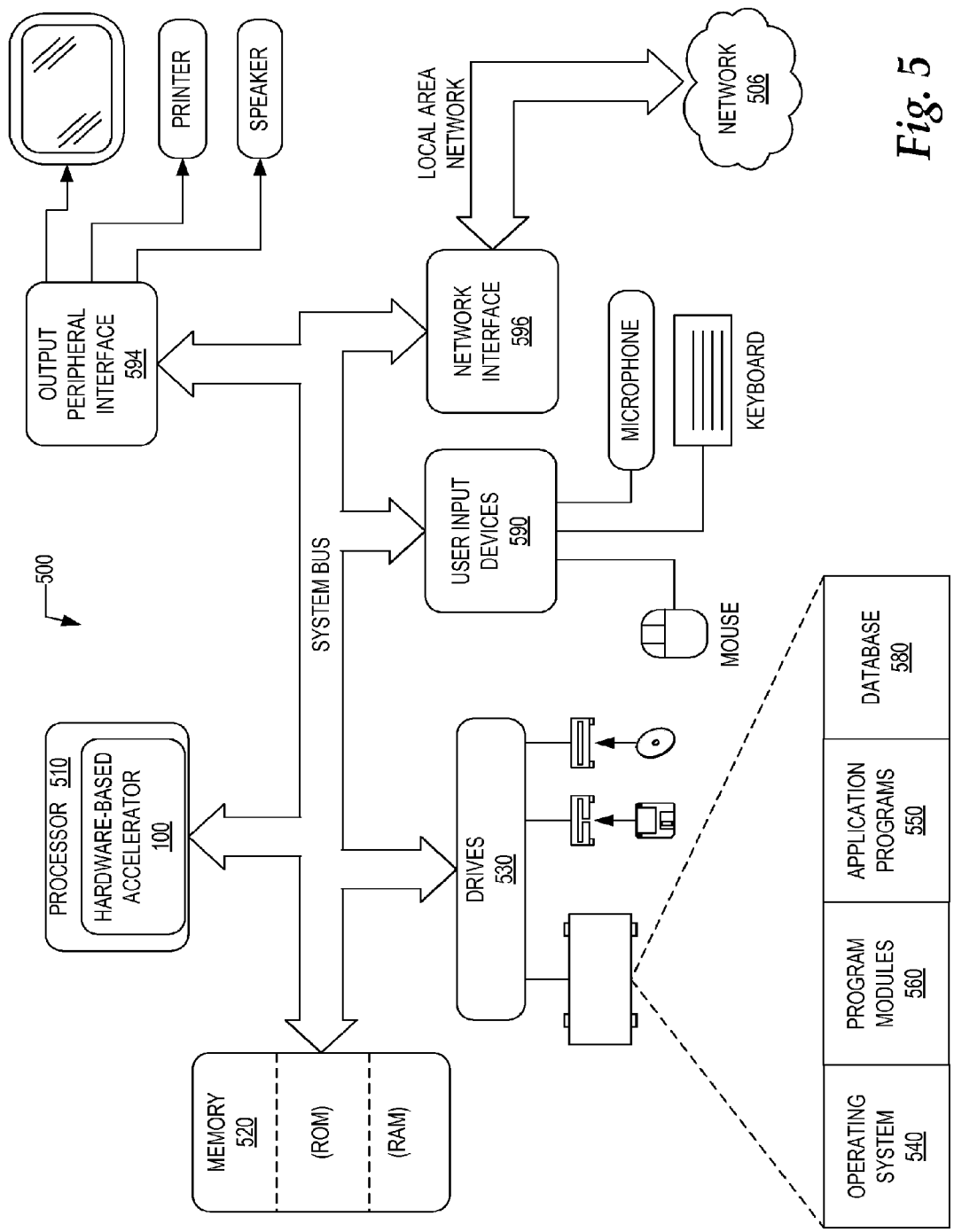
FIG. 5 is a block diagram illustrating a computer hardware architecture for an example computing system.

FIG. 5 is a block diagram illustrating a computer hardware architecture for an example computing system, arranged in accordance with at least some embodiments presented herein. FIG. 5 includes a computer 500, including a processor 510, memory 520, and one or more drives 530. The computer 500 may be implemented as a conventional computer system, an embedded control computer, a laptop, or a server computer, a mobile device, a set-top box, a kiosk, a vehicular information system, a mobile telephone, a customized machine, or other hardware platform. The processor 510 may be configured to implement the logic described in FIG. 1 or FIG. 2, including the hardware-based accelerator 100. The hardware-based accelerator 100 may be implemented within an on-chip cache, such as an L1, L2, or L3 cache, in accordance with various embodiments.

The drives 530 and their associated computer storage media, provide storage of computer readable instructions, data structures, program modules and other data for the computer 500. The drives 530 can include an operating system 540, application programs 550, program modules 560, and a database 580. The computer 500 further includes user input devices 590 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to the processor 510 through a user input interface that is coupled to a system bus, but may be coupled by other interface and bus structures, such as a parallel port, game port or a universal serial bus ("USB"). Computers such as the computer 500 may also include other peripheral output devices such as speakers, which may be coupled through an output peripheral interface 594 or the like.

The computer 500 may operate in a networked environment using logical connections to one or more computers, such as a remote computer coupled to a network interface 596. The remote computer may be a personal computer, a server, a router, a network PC, a peer device or other common network node, and can include many or all of the elements described above relative to the computer 500. Networking environments are commonplace in offices, enterprise-wide area networks ("WAN"), local area networks ("LAN"), intranets, and the Internet.

When used in a LAN or WLAN networking environment, the computer 500 may be coupled to the LAN through the network interface 596 or an adapter. When used in a WAN networking environment, the computer 500 typically includes a modem or other means for establishing communications over the WAN, such as the Internet or the network 506. The WAN may include the Internet, the illustrated network 506, various other networks, or any combination thereof. It will be appreciated that other mechanisms of establishing a communications link, ring, mesh, bus, cloud, or network between the computers may be used.

According to some embodiments, the computer 500 may be coupled to a networking environment. The computer 500 may include one or more instances of a physical computer-readable storage medium or media associated with the drives 530 or other storage devices. The system bus may enable the processor 510 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 520, whether characterized as RAM, ROM, flash, or other types of volatile or nonvolatile memory technology. The media may also represent secondary storage, whether implemented as the storage drives 530 or otherwise. Hard drive implementations may be characterized as solid state, or may include rotating media storing magnetically-encoded information.

The storage media may include one or more program modules 560. The program modules 560 may include software instructions that, when loaded into the processor 510 and executed, transform a general-purpose computing system into a special-purpose computing system. As detailed throughout this description, the program modules 560 may provide various tools or techniques by which the computer 500 may participate within the overall systems or operating environments using the components, logic flows, and/or data structures discussed herein.

The processor 510 may be constructed from any number of transistors or other circuit elements, which may individually or collectively assume any number of states. More specifically, the processor 510 may operate as a state machine or finite-state machine Such a machine may be transformed to a second machine, or specific machine by loading executable instructions contained within the program modules 560. These computer-executable instructions may transform the processor 510 by specifying how the processor 510 transitions between states, thereby transforming the transistors or other circuit elements constituting the processor 510 from a first machine to a second machine. The states of either machine may also be transformed by receiving input from the one or more user input devices 590, the network interface 596, other peripherals, other interfaces, or one or more users or other actors. Either machine may also transform states, or various physical characteristics of various output devices such as printers, speakers, video displays, or otherwise.

Encoding the program modules 560 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 560 may transform the physical state of the semiconductor memory 520 when the software is encoded therein. For example, the software may transform the state of transistors, capacitors, or other discrete circuit elements constituting the semiconductor memory 520.

As another example, the storage media may be implemented using magnetic or optical technology such as drives 530. In such implementations, the program modules 560 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 6:
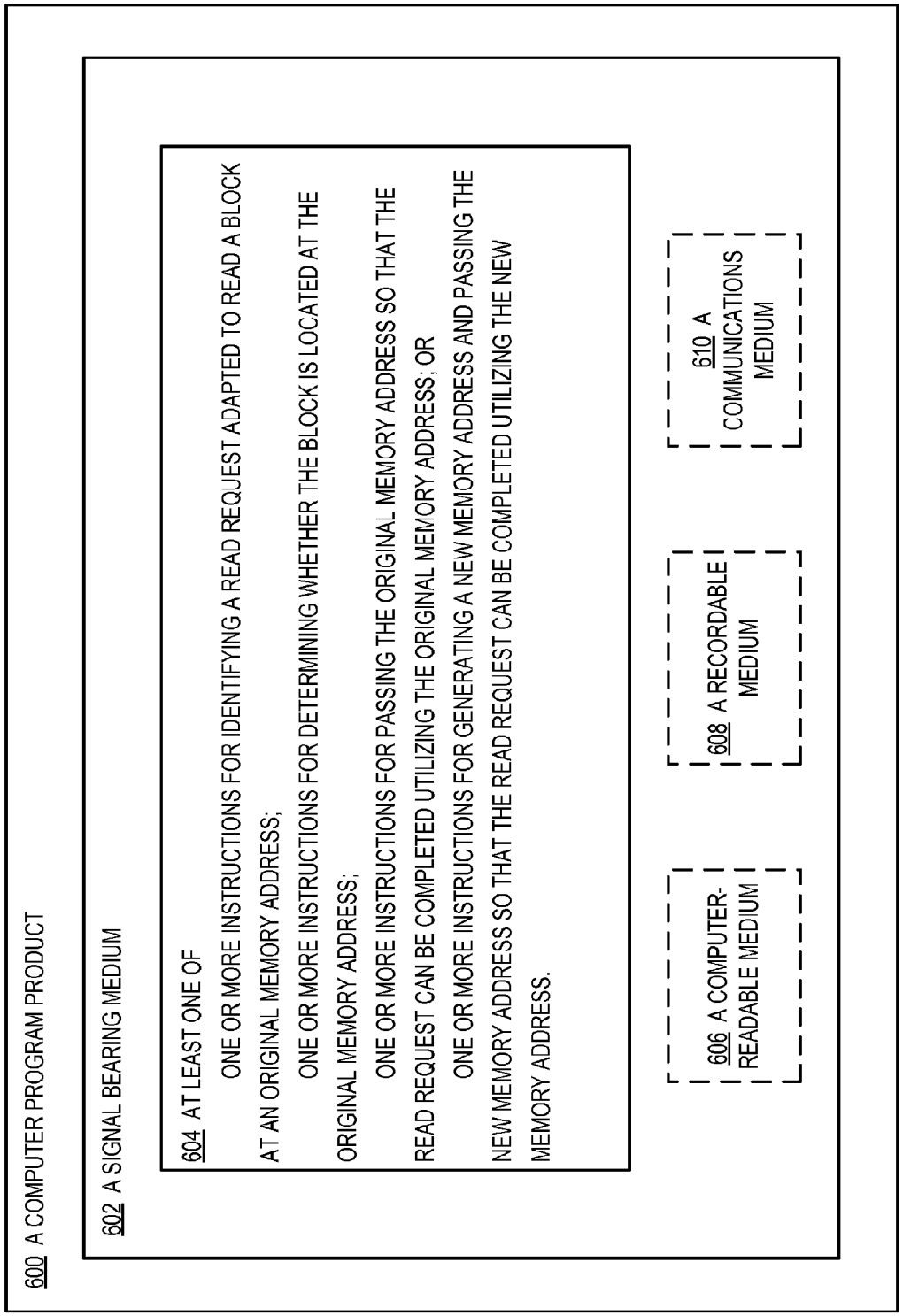
FIG. 6 is a schematic diagram illustrating a computer program product that includes a computer program for executing a computer process on a computing device, all arranged in accordance with at least some embodiments presented herein.

FIG. 6 is a schematic diagram that illustrates a computer program product 600 that includes a computer program for executing a computer process on a computing device, arranged in accordance with at least some embodiments presented herein. An illustrative embodiment of the example computer program product is provided using a signal bearing medium 602, and may include at least one instruction of 604: one or more instructions for identifying a read request adapted to read a block at an original memory address; one or more instructions for determining whether the block is located at the original memory address; one or more instructions for passing the original memory address so that the read request can be completed utilizing the original memory address; or one or more instructions for generating a new memory address and passing the new memory address so that the read request can be completed utilizing the new memory address. In some embodiments, the signal bearing medium 602 of the one or more computer program products 600 include a computer-readable medium 606, a recordable medium 608, and/or a communications medium 610.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the Detailed Description, claims, or Figures, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to provide a hardware-based accelerator adapted to manage copy-on-write in a memory of a computer, the method comprising:
   identifying a read request adapted to read a block in the memory at an original memory address, wherein the original memory address comprises a page index, a page offset, and a block offset, wherein the page index comprises an index portion and a tag portion;
   utilizing the hardware-based accelerator to determine whether the block is located in the memory at the original memory address based on a record in a lazy copy table, the record corresponding to a source page located at a source page index and a destination page located at a destination page index, wherein the record comprises a tag, a new page index, a copy-on-write status comprising a plurality of status identifiers, and a level identifier for the copy-on-write status ranging from a highest level of the copy-on-write status that corresponds to two or more blocks in the source page to a first level of the copy-on-write status that corresponds to a corresponding block in the source page, wherein each of the plurality of status identifiers comprises a status bit;
   storing the tag in a first entry of the lazy copy table, the source page index in a second entry of the lazy copy table, at least one of the plurality of status identifiers in a third entry of the lazy copy table, and the level identifier in a fourth entry of the lazy copy table;
   determining whether the copy-on-write status indicates that a block in the destination page has been modified from the corresponding block in the source page by recursively evaluating multiple instances of the copy-on-write status based on the level identifier in response to a determination that a quantity of the plurality of status identifiers in the copy-on-write status is less than a quantity of blocks in a page size of the memory, wherein recursively evaluating multiple instances of the copy-on-write status further comprises:
   converting the page offset from a binary representation to a bitmap;
   determining whether a result of a bitwise AND operation between the bitmap and the cop-on-write status equals zero;
   responsive to determining that the result of the bitwise AND operation between the bitmap and the copy-on-write status does not equal zero, determining that the copy-on-write status indicates that the block in the destination page has been modified from the source page; and
   responsive to determining that the result of the bitwise AND operation between the bitmap and the copy-on-write status equals zero, determining that the copy-on-write status indicates that the block in the destination page has not been modified from the source page;
   in response to determination by the hardware-based accelerator that the block is located in the memory at the original memory address and the copy-on-write status indicates that the block in the destination page has been modified from the corresponding block in the source page, utilizing the hardware-based accelerator to pass the original memory address to a controller of the computer, wherein the controller is adapted to perform the read request utilizing the original memory address; and
   in response to determination by the hardware-based accelerator that the block is not located in the memory at the original memory address and the copy-on-write status indicates that the block in the destination page has not been modified from the corresponding block in the source page, utilizing the hardware-based accelerator to generate a new memory address and to pass the new memory address to the controller of the computer, wherein the controller is adapted to perform the read request utilizing the new memory address.

2. The method of claim 1,
   wherein utilizing the hardware-based accelerator to determine whether the block is located in the memory at the original memory address comprises:
   identifying the record in the lazy copy tables; and
   determining whether the tag of the record matches the tag portion of the page index of the original memory address.

3. The method of claim wherein utilizing the hardware-based accelerator to pass the original memory address to the controller of the computer comprises:

responsive to determining that the tag does not match the tag portion, passing the original memory address to the controller of the computer, wherein the controller is adapted to perform the read request utilizing the original memory address.

4. The method of claim 2, wherein utilizing the hardware-based accelerator to generate the new memory address and to pass the new memory address to the controller of the computer comprises:
generating the new memory address comprising the new page index, the page offset, and the block offset, wherein the new memory address corresponds to the source page.

5. The method of claim 1, wherein the level identifier is greater than zero, and wherein recursively evaluating multiple instances of the copy-on-write status based on the level identifier comprises:
(a) determining that a current instance of the copy-on-write status indicates that a current region containing the block in the destination page has been modified from a corresponding current region in the source page, wherein the current region is larger than the block, and wherein the current instance of the copy-on-write status and the current region correspond to a current value of the level identifier;
(b) decrementing the level identifier;
(c) repeating (a) and (b) until either the copy-on-write status indicates that the region in the destination page has not been modified from the corresponding region in the source page, or the level identifier equals zero; and
(d) when the level identifier equals zero, determining that a final instance of the copy-on-write status corresponding to the zero value of the level identifier indicates that the block in the destination page has been modified from the corresponding block in the source page.

6. The method of claim 2, wherein the block comprises a first block, the page index comprises a first page index, the page offset comprises a first page offset, the block offset comprises a first block offset, the index portion comprises a first index portion, the tag portion comprises a first tag portion, the record comprises a first record, the tag comprises a first tag, the new page index comprises a first new page index, the copy-on-write status comprises a first copy-on-write status, the new memory address comprises a first new memory address, the method further comprising:
intercepting a write request adapted to write to a second block in the memory at a second memory address, wherein the second memory address corresponds to the destination page, wherein the second memory address comprises a second page index, a second page offset, and a second block offset, and wherein the second page index comprises a second index portion and a second tag portion;
in response to intercepting the write request, identifying a second record in the lazy copy table, wherein the second record is indexed in the lazy copy table at the second index portion, and wherein the second record comprises a second tag, a second new page index, and a second copy-on-write status;
generating a second new memory address comprising the second new page index, the second page offset, and the second block offset;
copying the second block from the source page at the second new memory address to the destination page at the second memory address;
setting the second copy-on-write status to indicate that the second block in the destination page has been modified; and
proceeding with the write using the second memory address.

7. The method of claim 2, wherein the block comprises a first block, the page index comprises a first page index, the page offset comprises a first page offset, the block offset comprises a first block offset, the index portion comprises a first index portion, the tag portion comprises a first tag portion, the record comprises a first record, the tag comprises a first tag, the new page index comprises a first new page index, the copy-on-write status comprises a first copy-on-write status, the new memory address comprises a first new memory address, the method further comprising:
intercepting a write request adapted to write to a second block in the memory at a second new memory address, wherein the second new memory address corresponds to the source page, wherein the second new memory address comprises a second new page index, a second page offset, and a second block offset, and wherein the second new page index comprises a new index portion and a new tag portion;
in response to intercepting the write request, identifying a mirror record in a mirror table, wherein the mirror record is indexed in the mirror table at the new index portion, wherein the mirror record comprises the new tag portion and a second page index, wherein the second page index comprises a second index portion and a second tag portion;
in response to identifying the mirror record in the mirror table, identifying a second record in the lazy copy table, wherein the second record is indexed in the lazy copy table at the second index portion, and wherein the second record comprises a second tag that matches the second tag portion, the second new page index, and a second copy-on-write status;
generating a second memory address comprising the second new page index, the second page offset, and the second block offset;
copying the second block from the source page at the second new memory address to the destination page at the second memory address;
setting the second copy-on-write status to indicate that the second block in the destination page has been modified; and
proceeding with the write using the second new memory address.

8. A copy-on-write accelerator configured to be implemented on a computer, the copy-on-write accelerator comprising:
a lazy copy table; and
a copy-on-write module coupled to the lazy copy table and configured to:
identify a read request adapted to read a block in a memory of the computer at an original memory address, the block requested to be read being less than an entire page content,
determine whether the block is located in the memory at the original memory address based on a record identified in the lazy copy table that corresponds to a source page located at a source page index and a destination page located at a destination page index, wherein the record comprises a tag, a new page index, and a copy-on-write status comprising a plurality of status identifiers and a level identifier for the copy-on-write status ranging from a highest level of the copy-on-write status that corresponds to two or more blocks in the source page to a first level of the copy-on-write status that corresponds to a corresponding block in the source page, store the tag in a first entry of the lazy copy table, the source page index in a second entry of the lazy copy table, at least one of the status identifiers in a third entry of the lazy copy table, and the level identifier in a fourth entry of the lazy copy table, determine whether the copy-on-write status indicates that a block in the destination page has been modified from the corresponding block in the source page, wherein in response to a determination that a quantity of the plurality of status identifiers in the copy-on-write status is less than a quantity of blocks in page size of the memory, the determination of whether the copy-on-write status indicates that the block in the destination page has been modified from the corresponding block in the source page comprises a recursive evaluation of multiple instances of the copy-on-write status based on the level identifier, in response to determination that the block is located in the memory at the original memory address and the copy-on-write status indicates that the block in the destination page has been modified from the corresponding block in the source page, pass the original memory address to a controller of the computer, wherein the controller is adapted to perform the read request by utilization of the original memory address, and in response to determination that the block is located in the memory at the original memory address and the copy-on-write status indicates that the block in the destination page has not been modified from the corresponding block in the source page, generate a new memory address and pass the new memory address to the controller of the computer, wherein the controller is adapted to perform the read request by utilization of the new memory address.

9. The copy-on-write accelerator of claim 8, wherein the lazy copy table comprises a plurality of columns and a plurality of records, wherein at least one of the plurality of records comprises a data value for a corresponding one of the plurality of columns, and wherein the plurality of columns comprises a tag column, a source page index column, and a copy-on-write status column.

10. A computing system, comprising:
a multicore processor comprising a processor core and a cache memory coupled to the processor core; and
a copy-on-write accelerator coupled to the cache memory, wherein the copy-on-write accelerator comprises:
 a lazy copy table including a plurality of columns and a plurality of records, wherein at least one of the plurality of records comprises a data value for a corresponding one of the plurality of columns, and wherein the plurality of columns comprises a tag column, a source page index column, and a copy-on-write status column, and
 a copy-on-write module coupled to the lazy copy table and configured to:
  identify a read request adapted to read a block in the cache memory at an original memory address corresponding to a destination page,
  determine whether the block is located in the cache memory at the original memory address based on a record identified in the lazy copy table that corresponds to a source page located at a source page index and the destination page which is located at a destination page index, wherein the record comprises a tag, a new page index, and a copy-on-write status comprising a plurality of status identifiers and a level identifier for the copy-on-write status ranging from a highest level of the copy-on-write status that corresponds to two or more blocks in the source page to a first level of the copy-on-write status that corresponds to a corresponding block in the source page,
  store the tag in a first entry of the lazy copy table, the source page index in a second entry of the lazy copy table, at least one of the status identifiers in a third entry of the lazy copy table, and the level identifier in a fourth entry of the lazy copy table,
  determine whether the copy-on-write status indicates that a block in the destination pane has been modified from the corresponding block in the source page, wherein in response to a determination that a quantity of the plurality of status identifiers in copy-on-write status is less than a quantity of blocks in a page size of the memory, the determination of whether the copy-on-write status indicates that the block in the destination page has been modified from the corresponding block in the source page comprises a recursive evaluation of multiple instances of the copy-on-write status based on the level identifier,
  in response to determination that the block is located in the cache memory at the original memory address and the copy-on-write status indicates that the block in the destination page has been modified from the corresponding block in the source page, pass the original memory address to the processor core, wherein the processor core is adapted to perform the read request by utilization of the original memory address, and
  in response to determination that the block is not located in the cache memory at the original memory address and the copy-on-write status indicates that the block in the destination page has not been modified from the corresponding block in the source page, generate a new memory address and pass the new memory address to the processor core, wherein the processor core is adapted to perform the read request by utilization of the new memory address.

11. The computing system of claim 10, wherein the processor core comprises a first processor core and the cache memory comprises a first cache memory, wherein the multicore processor further comprises a second processor core and a second cache memory coupled to the second processor core, and wherein the copy-on-write module is further configured to:
 receive a first notification that a process adapted to access the source page or the destination page in the cache memory is migrated from the first processor core to the second processor core;
 after the first notification is received, set a cache state associated with the block in the cache memory to a modified state;
 receive a second notification that the process executed by the second processor core has attempted to access the source page or the destination page;
 after the second notification is received, copy the block from the source page destination page; and after the block is copied from the source page to the destination page, set the cache state associated with the block in the cache memory from the modified state to a shared state.

12. The computing system of claim 10, wherein the copy-on-write accelerator comprises a first copy-on-write accelerator, the lazy copy table comprises a first lazy copy table, the processor core comprises a first processor core, and the cache memory comprises a first cache memory, the computing system further comprising a second copy-on-write accelerator having a second lazy copy table, wherein the multicore processor further comprises a second processor core and a second cache memory coupled to the second processor core, wherein the second copy-on-write accelerator is coupled to the second cache memory, and wherein the copy-on-write module is further configured to:

receive a notification that a process adapted to access the destination page is migrated from the first processor core to the second processor core; and after the notification is received, copy or migrate the plurality of records from the first lazy copy table to the second lazy copy table.

13. The computing system of claim 10, wherein the copy-on-write module is further configured to:

receive a notification that a process adapted to access the destination page has terminated; and after the notification is received, evict the records from the lazy copy table.

14. The computing system of claim 10, wherein the copy-on-write module is further configured to:

receive a notification that a process adapted to access the destination page has made a call to an exec family of functions; and after the notification is received, evict the records from the lazy copy table.

15. The computing system of claim 10, wherein the copy-on-write module is further configured to:

determine whether the lazy copy table is full; and in response to determination that the lazy copy table is full, select a candidate record in the plurality of records having a highest pop count, complete a copy of blocks associated with the candidate record from the source page to the destination page, and evict the candidate record from the lazy copy table.

16. The computing system of claim 10, wherein the copy-on-write module is further configured to:

identify one or more candidate records in the plurality of records, wherein at least one of the candidate records corresponds to a pop count greater than a threshold;

complete a copy of blocks associated with the candidate records from the source page to the destination page; and evict the candidate records from the lazy copy table.

* * * * *

UNITED STATES PATENT AND TRADEMARK OFFICE
CERTIFICATE OF CORRECTION

PATENT NO. : 9,304,946 B2  
APPLICATION NO. : 13/813591  
DATED : April 5, 2016  
INVENTOR(S) : Solihin Page 1 of 1

It is certified that error appears in the above-identified patent and that said Letters Patent is hereby corrected as shown below:

On the title page, item (54) and in the specification, column 1, line 1, Title, delete "HARDWARE-BASE" and insert -- HARDWARE-BASED --, therefor.

In the specification

Column 1, Line 11, delete "§371" and insert -- § 371 --, therefor.

Column 17, Line 3, delete "machine Such" and insert -- machine. Such --, therefor.

In the claims

Column 20, Line 65, Claim 3, delete "claim" and insert -- claim 2, --, therefor.

Column 24, Line 17, Claim 10, delete "pane" and insert -- page --, therefor.

Signed and Sealed this
Twenty-eighth Day of June, 2016

Michelle K. Lee
*Director of the United States Patent and Trademark Office*